Jan. 30, 1968   W. M. MAY   3,366,211
LUBRICATING SYSTEM FOR WET CLUTCHES
Filed Sept. 13, 1965

INVENTOR.
WALTER M. MAY
BY
Brumbaugh, Free, Graves & Donohue
his    ATTORNEYS 3,366,211
LUBRICATING SYSTEM FOR WET CLUTCHES
Walter M. May, Allentown, Pa., assignor to Mack Trucks,
Inc., Montvale, N.J., a corporation of New York
Filed Sept. 13, 1965, Ser. No. 486,606
1 Claim. (Cl. 192—113)

ABSTRACT OF THE DISCLOSURE

A lubricating and cooling system for a wet clutch comprising an annular, inwardly opening trough affixed to the flywheel for picking up and propelling liquid along a circular path upon rotation of the flywheel, and a conduit having one end positioned in the path of the rotating body of liquid so that the liquid is propelled under pressure into the conduit. The other end of the conduit is located to discharge the liquid into the central portion of the clutch, thereby affording, due to centrifugal forces, passage of the liquid radially outwardly across the clutching elements and other parts of the clutch. A baffle located in the bottom of the housing, which serves as a reservoir for the liquid, between the trough and the starting gear performs the important function of keeping the oil level in the region of the flywheel low and thus preventing the starting gear from the adversely affecting the operation of the trough in picking up liquid.

---

Figure 1:
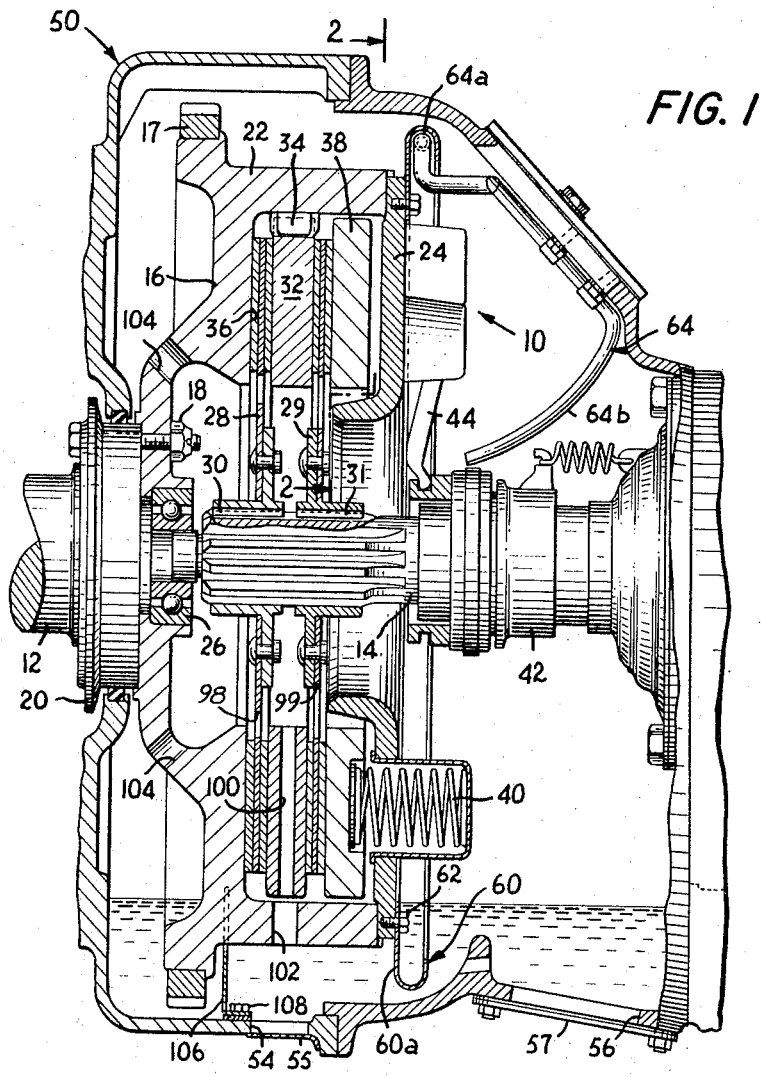

This invention relates to wet clutches and, more particularly, to a wet clutch having a novel and improved system for lubricating and cooling the clutch.

In wet clutches, the clutch generally runs in a lubricating liquid, usually oil, contained in the clutch housing. Often, the oil is distributed through the housing and to the clutch parts merely by the splashing action of the flywheel and outwardly located portions of the clutch as they pass through the oil. With this type of lubrication, the oil may not reach inwardly located portions of the clutch in sufficient quantities to provide effective lubrication and cooling.

It has previously been suggested that improved lubrication can be obtained by providing an external pressure lubricating system including a reservoir, a pump, and piping into and out of the clutch housing. For example, the main engine oil system can be employed for this purpose. This expendient, however, detracts from the efficiency of the engine lubricating system and generally requires increased reservoir capacity, a higher capacity pump, and extensive piping, thereby making this type of system relatively costly to provide and subject to malfunction. Another external system includes a separate oil reservoir and pumping system, which, like the adaptation of the main engine oil system to provide clutch lubrication, is costly, and is a source of trouble. With both of these external systems, it is also advisable to provide a warning system to indicate a loss of pressure in the lubricating oil supply to the clutch, a further contributor to increased cost.

The above-described and other disadvantages of presently known lubricating systems for wet clutches are overcome, in accordance with the invention, by a novel and improved lubricating system which is located entirely within the clutch housing and requires no external reservoir, pump, piping and other auxiliary equipment, such as that required with many presently known systems. More particularly, the lubricating and cooling oil contained in the clutch housing is propelled along a predetermined path and into the inlet end of a conduit under pressure. The outlet of the conduit is positioned to discharge the oil into the region of the clutch inwardly of the clutching elements. The oil propelling arrangement consists of an annular, inwardly opening trough passing through the oil upon rotation of the flywheel and, by the action of frictional and centrifugal forces, picking up and conducting the oil to the conduit inlet. In other words, the trough remains, during the rotation of the flywheel, filled to a certain extent throughout with a rotating body of oil. The energy imparted to the oil by virtue of its rotational velocity causes the oil to be introduced into the conduit under pressure. Preferably, the inlet end of the conduit is located at the uppermost point within the trough so that gravity forces supplement the inertial forces on the oil to propel it into the inner region of the clutch.

Preferably, the trough is mounted on the rear part of the clutch, and the region of the clutch housing through which the trough passes upon rotation is isolated from the starting gear on the flywheel by a baffle mounted in the lower portion of the housing. The baffle prevents, to a substantial extent, the passage of oil between the portion of the housing through which the trough passes and the portion through which the starting gear passes and thereby prevents the splashing and agitation of the oil by the starting gear from affecting the operation of the trough.

It will be understood that the lubricating system of the invention supplements the splashing action of the flywheel as it passes through the oil, the splashing remaining a significant part of the lubricating and cooling operation. The system, in accordance with the invention, provides, however, a considerable improvement in lubrication and cooling in the inner region of the clutch and, particularly, the frictionally engaging surfaces by markedly increasing oil flow over them. To this end, it is desirable to provide suitable passages and openings in various clutch elements to improve the distribution and flow of the oil delivered from the lubricating system conduit throughout the clutch. Thus, the friction discs are provided with a series of openings arranged concentrically to the shafts and aligned so as to pass by the outlet of the conduit, thereby permitting oil discharged from the conduit to pass longitudinally through the clutch dics toward the flywheel. Additionally, openings are provided in the flywheel for permitting the oil to leave the space within the clutch discs and behind the flywheel and return to the housing. Passages are also formed in the clutch ring and in the flywheel flange to provide additional flow and, particularly, to provide a greater flow across the clutch ring and clutch discs.

A lubricating system, in accordance with the invention, provides a considerably improved flow of oil through the clutch parts, as compared to wet clutches in which the oil is distributed only by the splashing action. The oil is continuously circulated through the clutch and returned back to the clutch housing, thereby improving the cooling action, as well as ensuring effective lubrication. The lubricating system can be adapted to conventional clutches of many types with relatively little modification.

Figure 2:
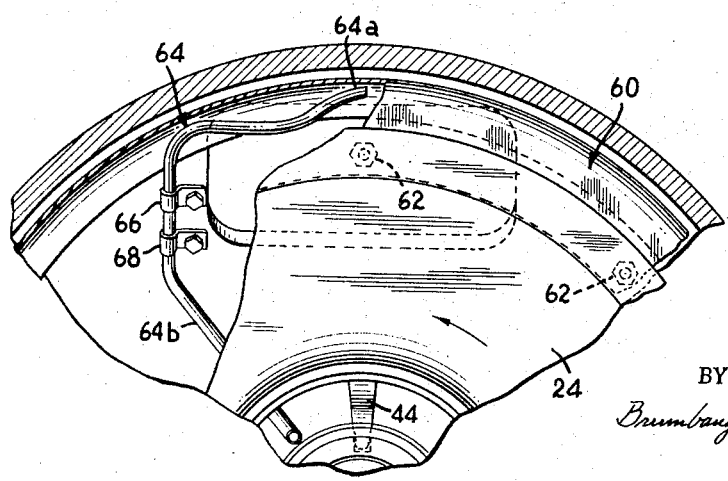

For a better understanding of the invention, reference may be made to the following description of an exemplary embodiment, taken in conjunction with the figures of the accompanying drawings, in which:

FIG. 1 is a side view in section of the clutch and the lubricating system, the section being taken generally along a vertical plane through the clutch axis; and FIG. 2 is a partial end view in section of the clutch taken generally along the line 2—2 of FIG. 1 and in the direction of the arrows, a portion of the flywheel cover being broken away to show the position of the lubricating system conduit therein.

Referring to FIG. 1, the clutch 10 is coupled to an engine crankshaft 12 and selectively transmits torque to a main drive gear shaft 14. A flywheel 16, which carries a starting gear 17, is secured by bolts 18 to a flange 20 on the crankshaft and has a rearwardly directed flange 22 extending about its perimeter. A rear cover member 24 is fastened by bolts to the flywheel flange 22.

The front end of the drive gear shaft 14 is journaled in a pilot bearing 26 carried by the flywheel, and a pair of friction discs 28 and 29, riveted to carriers 30 and 31, respectively, are splined to the front end of the shaft 14. Located between the friction discs 28 and 29 is a clutch ring 32 which is mounted on and for rotation with the flywheel by means of several inwardly extending bosses 34 received in slots formed in the clutch ring 32. The clutch discs 28 and 29 and the ring 32 are selectively engaged between a surface 36 on the flywheel and a pressure ring 38 which is urged in the direction of the flywheel by radially spaced-apart springs 40 positioned between the pressure ring and the member 24. The clutch is disengaged by forward axial movement of a sleeve member 42 acting through circumferentially spaced-apart levers 44 coupled to the pressure ring 38, the element 42 being suitably coupled by a suitable actuating mechanism to the clutch pedal of the vehicle (not shown).

The clutch is contained in a closed housing 50 which is suitably mounted on the vehicle. The housing is filled to a predetermined level with a suitable lubricating and cooling fluid, such as oil. The oil can be periodically changed by draining it through drain holes 54 and 56 provided with caps 55 and 57, respectively. Whenever the engine is running, the outwardly located portion of the flywheel will pass through the oil accumulated in the bottom of the clutch housing and will splash the oil through the housing and on to the clutch thus providing partial lubrication and cooling for the clutch.

The above-described clutch is of generally conventional construction, except for the provision of passages and openings (to be described below) for improving oil flow through the clutch elements. It will be understood that the lubricating system of the invention is readily adaptable to many types of clutches, some of which may be quite different from the construction of the clutch illustrated in the drawings.

The lubricating system consists of an annular inwardly opening trough 60 affixed by bolts 62 to the flywheel cover member 24 and a conduit 64 for conducting oil picked up by the trough into the inner region of the clutch. The trough 60 is generally J-shaped in section and the longer leg 60a bears against the flywheel cover and receives the bolts. The conduit 64 is mounted by clamps 66 and 68 secured to the inner wall of the clutch housing; it is a rigid tubing or pipe, and its inlet end 64a is bent upwardly into the trough and then in a direction so that it opens against the direction of rotation of the flywheel and trough. The outlet portion 64b of the conduit is guided along the clutch housing and then is lead radially inwardly and forwardly so that its outlet end is positioned at a point located inwardly of and behind the clutch ring and clutch discs.

In operation, rotation of the flywheel, which of course occurs any time the vehicle engine is running, causes the trough to pass through the oil contained in the clutch housing. The frictional forces between the trough and liquid and the centrifugal forces acting on the liquid cause the trough to become filled, to a degree, throughout its entire periphery with a rotating body of oil. The energy imparted to the oil by rotation propels it into the conduit 64 under pressure. The pressure created by inertial forces on the oil entering the conduit is enhanced by gravitational forces, and the oil is discharged from the conduit in a stream under pressure into the inwardly located region of the clutch.

In particular, the oil stream is directed through the forwardly directed flange of the flywheel cover and impinges upon the inwardly located portions of the clutch discs. Upon impinging on the clutch discs, it is deflected and propelled outwardly by centrifugal force along the rear disc 29. Some of the oil passes through openings 98 and 99 in the clutch discs 28 and 29, out along the surface of the disc 28, or into the pilot bearing 26.

The clutch ring 32 and the flywheel flange 22 are provided with a plurality of radially disposed aligned passages 100 and 102, respectively, which permit oil entering the central region of the clutch inwardly of the clutch elements to pass radially outwardly by centrifugal force from the discs and ring back to the housing. Further, openings 104 are provided in the flywheel 16 to permit oil to flow from the space within the clutch discs and the flywheel back to the housing, thereby preventing the accumulation of oil in the interior of the clutch. The openings and passages provided in the various clutch parts provide for improved distribution of the oil and, therefore, for highly effective lubrication and cooling of the clutch. The oil contained in the clutch housing is circulated at a high turnover rate from the housing, into the conduit and thence to the inner region of the clutch, outwardly over the discs and ring, and back into the housing.

To limit the influence of the splashing and agitation of the oil by the starting gear 17 on the operation of the trough, a baffle 106 is affixed by bolts 108 to the bottom of the housing just behind the starting gear. The inner edge of the baffle is located closely adjacent the outer surface of the flywheel, thereby leaving little space for oil to flow forward to the region of the housing through which the gear 17 rotates, and the ends of the baffle are above the oil level. Thus, the oil level in the front of the housing, during normal engine speeds, is kept relatively low and splashing by the starting gear is limited. Agitation of the oil by the starting gear is limited, for the most part, to the housing portion in front of the baffle.

If desired, a suitable cooling system can be provided in the bath of oil contained in the housing. For example, a cooling coil can be installed in the oil housing and cooling fluid from the engine cooling system circulated through it to maintain the oil temperature at a level providing the desired cooling for the clutch oil.

It will be understood that the above-described embodiment of the invention is merely exemplary, and that many modifications and variations of it can be made by those skilled in the art without departing from the spirit and scope of the invention. All such modifications and variations are intended to be included within the scope of the invention as defined in the appended claim.

I claim:

1. In a wet clutch having a clutch housing containing a lubricating and cooling fluid in the lower portion thereof, a flywheel carrying a starting gear at the periphery thereof, a driven member and clutching elements for selectively transmitting torque from the flywheel to the driven member, the combination therewith of a lubricating and cooling system comprising means coupled to the flywheel for propelling a stream of the liquid along a predetermined path, the liquid propelling means including an annular inwardly opening trough affixed to the flywheel at a rearward position thereof, the trough passing through the liquid upon rotation of the flywheel and picking up and propelling liquid by frictional and centrifugal forces, conduit means having an inlet end positioned in the path of the liquid stream, whereby the stream flows into the conduit under pressure, and having an outlet end positioned to discharge the liquid from the conduit into the region inwardly of the clutching elements, and a baffle affixed to the clutch housing and located entirely below the axis of the clutch to restrict the passage of oil between the region of the housing adjacent the starting gear and the remainder of the housing and thereby restrict the affect of splashing by the starting gear on the operation of the trough.

References Cited

UNITED STATES PATENTS

| | | | |
|---|---|---|---|
| 2,210,416 | 8/1940 | Kiep et al. | 192—105 X |
| 3,104,746 | 9/1963 | Gadd et al. | 192—113.2 X |
| 3,176,813 | 4/1965 | Lee et al. | 192—113.2 X |

FOREIGN PATENTS

| | | |
|---|---|---|
| 894,029 | 12/1944 | France. |

BENJAMIN W. WYCHE III, *Primary Examiner.*